United States Patent [19]

Nied et al.

[11] Patent Number: 4,906,812

[45] Date of Patent: Mar. 6, 1990

[54] FIBER OPTIC LASER JOINING APPARATUS

[75] Inventors: Herman A. Nied, Ballston Lake; Marshall G. Jones, Scotia, both of N.Y.

[73] Assignee: General Electric Company, Schenectady, N.Y.

[21] Appl. No.: 288,220

[22] Filed: Dec. 22, 1988

[51] Int. Cl.⁴ ............................................. B23K 26/00
[52] U.S. Cl. ............................ 219/121.63; 219/121.83; 219/121.84
[58] Field of Search ....................... 219/121.63, 121.64, 219/121.73, 121.84, 121.83, 121.85, 121.6, 121.68, 121.64, 121.67, 121.72

[56] References Cited

U.S. PATENT DOCUMENTS

| | | | |
|---|---|---|---|
| 3,383,491 | 5/1968 | Muncheryan | 219/121.63 |
| 3,622,743 | 11/1971 | Muncheryan | 219/121.63 |
| 4,121,087 | 10/1978 | Malmuth et al. | 219/121.64 X |
| 4,564,736 | 1/1986 | Jones et al. | 219/121.63 X |
| 4,578,554 | 3/1986 | Coulter | 219/121.63 |
| 4,676,586 | 6/1987 | Jones et al. | 219/121.63 X |
| 4,681,396 | 7/1987 | Jones | 219/121.63 X |

Primary Examiner—C. L. Albritton
Attorney, Agent, or Firm—James S. Beulick; James C. Davis, Jr.; Paul R. Webb, II

[57] ABSTRACT

Fiber optic laser apparatus for spot welding, brazing, or soldering comprises an optical fiber for transmitting a laser beam to a workpiece, and a tool disposed at an output end of the optical fiber for mechanically engaging and applying pressure to the workpiece. The output end of the optical fiber is supported within a longitudinal bore of the tool with the tip of the fiber closely adjacent to an opening in a workpiece-engaging end of the tool. The diverging laser beam from the end of the optical fiber projects a spot onto the workpiece through the opening with sufficient power to cause melting without the necessity for a lens system for focusing of the laser beam.

20 Claims, 2 Drawing Sheets

FIBER OPTIC LASER JOINING APPARATUS

BACKGROUND OF THE INVENTION

This invention relates generally to apparatus for joining materials as by spot welding, brazing or soldering, and more particular to apparatus for joining materials using a laser beam.

Although materials joining processes such as spot welding, brazing, or soldering are well known and are used extensively for joining parts including electrical components, it has been difficult to apply such joining processes to the microelectronics industry for joining small microelectronic parts. One reason has been the difficulties in precisely controlling the power applied to the parts and in confining the heating to a localized region of the parts so that the parts are joined without damage to the parts or to other materials or components in their vicinity.

Normal brazing and soldering processes require that an electrode which has been resistance heated be brought into mechanical contact with the parts and held in contact with the parts long enough to enable sufficient heat to be transferred by conduction to effect joining. With a heated electrode, it is very difficult to confine the heating to a localized area or to control the amount of heat which is transferred to components in the vicinity of the electrode, particularly when the parts being joined are located in a confined area. In a resistance spot welding process, a split electrode, as of copper, is frequently used to pass electrical current through two parts which are held in mechanical contact with one another. The current produces resistance heating and joins the parts. As with brazing and soldering, it is difficult in a spot welding process to control precisely the amount of heating or to confine the heat affected area of the parts sufficiently to avoid damage.

Apparatus employing laser beams are known for performing various material treating processes such as cutting, drilling, welding, brazing, marking, or localized heat treating. Typical of these apparatus are those disclosed in commonly assigned U.S. Pat. Nos. 4,564,736, 4,676,586, and 4,681,396 wherein an optical fiber is employed for transmitting a laser beam from a remote source to a processing region of a workpiece. In these apparatus, the output end of the optical fiber is supported in an output coupler adjacent to the workpiece. The output coupler includes a lens system for focusing the diverging laser beam emitted from the end of the optical fiber to a small spot on the workpiece. The output coupler does not contact the workpiece, but is merely used for focusing the laser energy onto the workpiece. Thus, the apparatus and processes disclosed in the parents are non-contact ones, which is generally true of other known laser materials processes, such as laser welding. Although laser processes can be precisely controlled so as to provide a desired localized deposition of high energy, the absence of mechanical contact between the tool which supplies the laser beam and a workpiece is disadvantageous in laser joining processes such as laser welding, since it requires that external positioning devices or fixtures be employed to hold two workpieces to be joined in mechanical contact. This may render automation of the joining process difficult and inconvenient. Moreover, in some applications, as, for example, where it is necessary to join parts which are located in a confined space, it is impractical to employ external positioning devices or fixtures to hold the parts together, and this may preclude joining the parts using a laser process.

It is desirable to afford a fiber optic laser joining apparatus which voids the foregoing and other problems of known laser joining apparatus, and which facilitates the joining of microelectronic components reliably, rapidly, and without damage to the components or to other components in their vicinity. It is to these ends that the present invention is directed.

SUMMARY OF THE INVENTION

The invention affords highly advantageous laser joining apparatus which is capable of joining small or microsized components, such as microelectronic components, reliably and rapidly without damaging either the components or other parts or materials in their vicinity. The invention is particularly advantageous in affording a workpiece-contacting tool disposed on an output end of an optical fiber which carries the laser beam to the workpiece. The tool is adaptable either to an automated joining process or is useful as a hand-held tool, and enables mechanical pressure to be applied to workpieces being joined so that they may be held in contact during the joining process. Accordingly, the invention is useful for spot welding, brazing, or soldering processes which require that two parts being joined be held in mechanical contact. Advantageously, this avoids the necessity for fixtures or other external positioning devices for holding the workpieces to be joined, and enables the joining of workpieces which are located in a confined space. The invention enables the amount of power applied to the workpieces to be precisely controlled and confined to a small localized region, thereby avoiding damage either to the workpieces or to surrounding materials.

Briefly stated, in one aspect the invention affords laser joining apparatus which comprises an optical fiber for transmitting a laser beam, and means for injecting the laser beam into an input end of the optical fiber. Disposed at the output end of the fiber is an elongated housing which has means for engaging and exerting pressure on a workpiece, such as a component or part which is to be joined to another component or part. The housing has an opening in its end which engages the workpiece, and the output end of the optical fiber is supported within the housing with respect to the opening so that a diverging portion of the laser beam which is emitted from the optical fiber is projected through the opening onto the workpiece.

In contrast to other known laser materials processing apparatus as disclosed, for example, in the above-referenced patents, the invention does not employ lens systems at the output end of the optical fiber for focusing the diverging laser beam which is emitted from the output end of the fiber. Rather, the diverging laser beam itself is projected onto the workpiece and used directly for applying optical energy to the workpiece for heating it. This simplifies the workpiece-engaging tool of the invention considerably and enables it to be very slender so that it can access components located in a confine space.

The output end of the optical fiber may be supported within the tool housing so that the fiber is parallel to the longitudinal axis of the housing and to the workpiece, and such that the top if the fiber core is positioned adjacent to the opening in the end of the housing and a predetermined distance from the workpiece. The opening in the housing may communicate with a chamber within the housing defined partially by a protective window, e.g., quartz, disposed between the fiber top and the opening for protecting the fiber top from material splashes or the like produced during the joining process. Passages in the housing may communicate with the chamber to enable a processing gas, such as an inert gas, to flow through the chamber and past the quartz window. The processing gas serves to envelop the region of the workpiece exposed to the chamber via the opening in the housing. This affords an inert atmosphere for the portion of the workpiece within the opening, and the gas flow through the chamber enables varporized products of the welding process to be carried away. This assists in keeping the quartz window clean and depresses the plume, thereby improving the coupling efficiency between the laser beam and the workpiece.

DESCRIPTION OF THE PREFERRED EMBODIMENT

The invention is particularly well adapted for joining workpieces, such as microelectronic components, in a spot welding process and will be described in that context. As will be appreciated, however, this is illustrative of only one utility of the invention.

Figure 1:
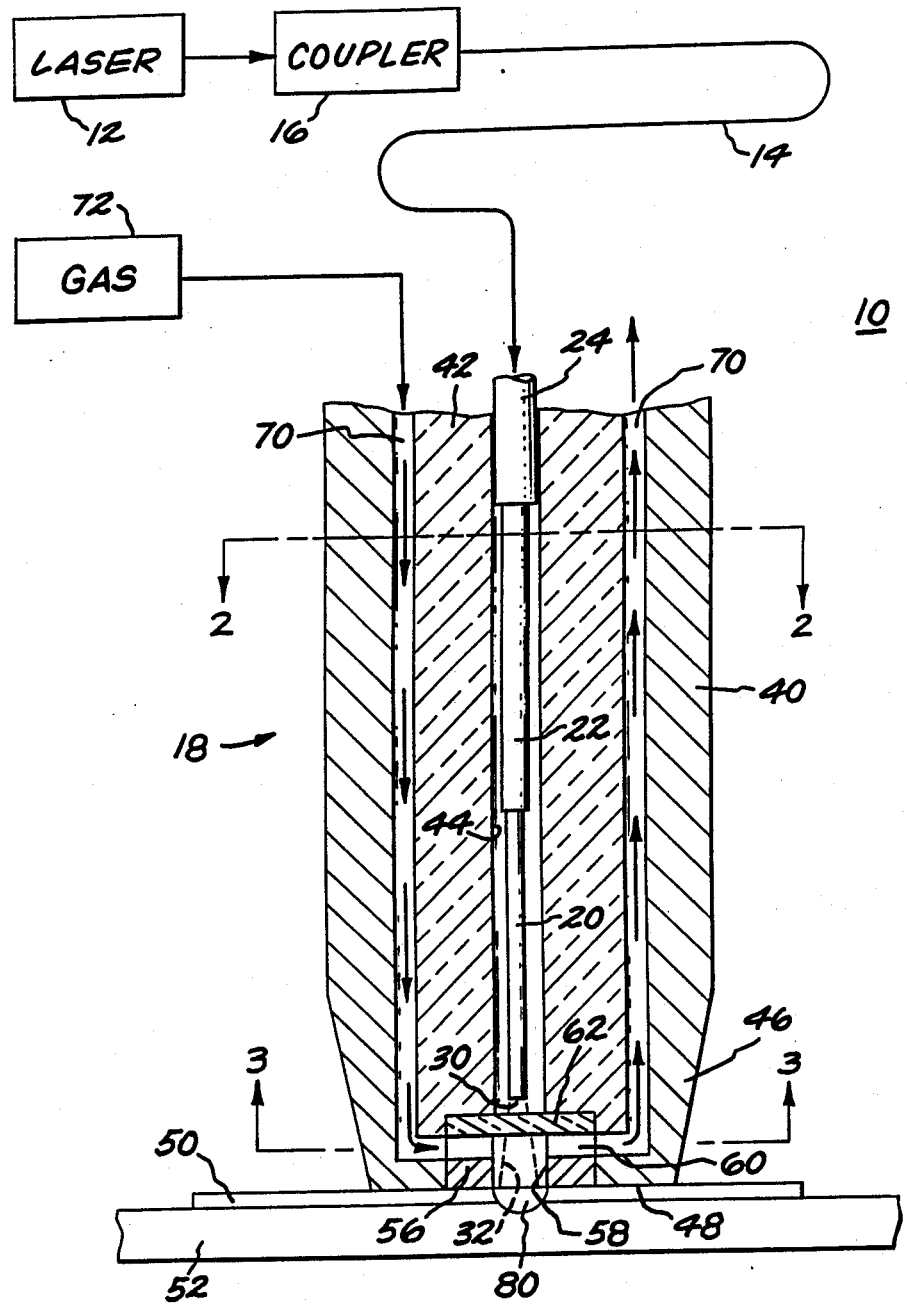
FIG. 1 is a diagrammatic view illustrating fiber optic laser joining apparatus in accordance with the invention.

FIG. 1 illustrates diagrammatically a fiber optic laser joining apparatus 10 in accordance with the invention. As shown, the apparatus may comprise a laser 12, which may be a solid state pulsed or continuous wave neodymium:YAG laser or the like, (e.g. a visible or ultraviolet source) having an output beam which is coupled into an optical fiber 14 by means of a coupler 16 for transmission of the beam to a tool 18. Tool 18 serves as a holder for the optical fiber and as a device for applying a force to a workpiece, as will be described shortly.

Optical fiber 14 may be a single thin (0.1–1.5 mm diameter) optical fiber comprising a quartz core 20 covered by a cladding 22, as of silicone or glass, and having an outer protective jacket or sheath 24, as of nylon. Coupler 16 may be similar to the couplers disclosed in the afore-referenced patents, the disclosures of which are incorporated by reference herein, and may comprise a holder for the input end of the optical fiber and a lens for focusing the laser beam onto the quartz core at the input end. As described in the afore-referenced patents, the laser beam may be injected into the optical fiber by focusing the laser beam to a small spot on the fiber core such that the diameter of the spot is less than the diameter of the core and such that the included angle of the focused beam is less than the numerical aperture of the fiber. The laser beam is transmitted through the optical fiber and is emitted from the bottom 30 of the fiber core at the output end of fiber as a diverging beam 32 (indicated by dotted lines in the figure).

As show in the figures, tool 18 may comprise an elongated generally cylindrical outer housing 40 and an inner cylindrical support member 42 which has an axial bore 44. Housing 40 may be formed of a metal, a plastic or a high temperature ceramic. Member 42 is preferably of a non-metallic material, such as quartz or plastic. The axial bore receives the output end of the optical fiber 14, and means (not illustrated), such as clamps, etc. may be included for fixing the optical fiber in the bore. The lower (in FIG. 1) end region of the outer housing may taper, as shown at 46, to a flat end 48 which is adapted to engage a first workpiece 50. The flat end 48 of the housing, which is substantially normal to the longitudinal axis of the housing, enables pressure to the applied to workpiece 50, as to hold it pressed against a second workpiece 52, for example.

Figure 2:
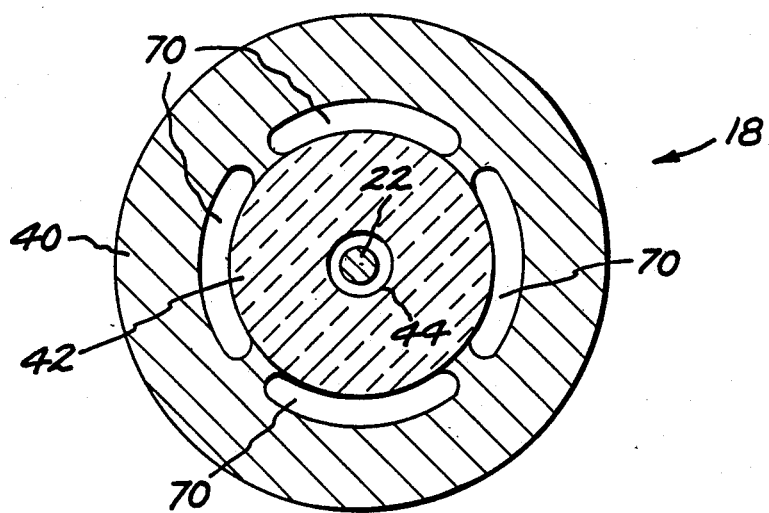
FIG. 2 is a cross-sectional view taken approximately along the line 2—2 of a workpiece-engaging tool of the apparatus of FIG. 1.
Figure 3:
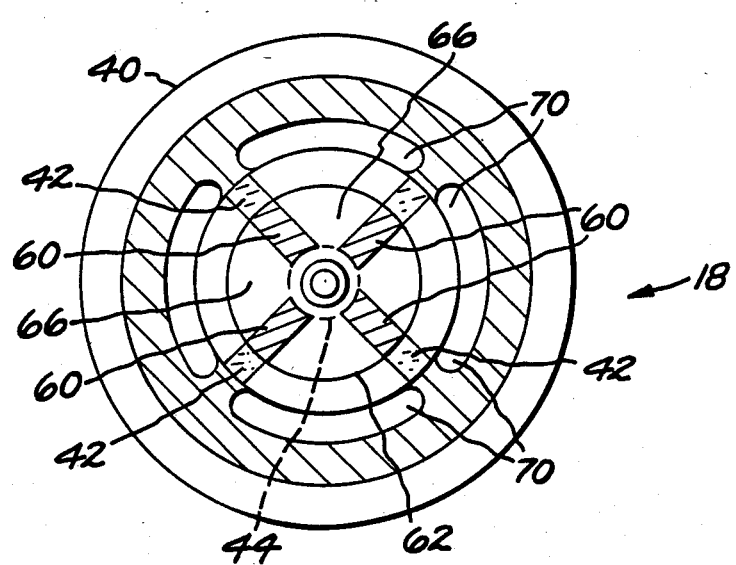
FIG. 3 is a cross-sectional view of the tool of FIG. 1 taken approximately along the line 3—3.

A top-slotted annular bushing 56 having an opening 58 therethrough may be press fitted into flat end 48 of the housing so that the opening 58 is coaxial with respect to bore 44 of the inner support member 42 of the tool. The slotted top portion of the bushing may provide radially extending support portions 60, as best illustrated in FIG. 3, which support and retain a protective window 62, as of quartz, in a corresponding cutout in the lower end of the member 42, as shown. The protective window and the opening 58 in the bushing define a chamber in the lower end of the tool adjacent to the surface of workpiece 50. The chamber may communicate by means of sector-shaped channels 66 located in the opening areas between the radially extending support portions 60 at the top of the bushing and in the end of member 42 with a plurality of longitudinally extending arc-shaped passages 70 (best illustrated in FIGS. 2 and 3) formed on the inner surface of housing 40 between the housing and support member 42. Each passage 70 symmetrically disposed about the longitudinal axis, and four corresponding channels 66.

One or more of the passages 70 may be connected to a source 72 of gas, such as inert gas, as shown in FIG. 1. The gas from source 72 flows through the passages and channels, as shown by the arrows, and may be used to purge the chamber in the bushing during a welding, brazing or soldering process, as will be described in more detail shortly.

As shown in FIG. 1, the output end of the optical fiber 14 is supported within the bore 44 of member 42 such that it is coaxial with housing 40 and such that the fiber is normal to the flat end 48 of the holder. The end region of the optical fiber may be prepared to reduce losses, as described in the afore-referenced U.S. Pat. No. 4,564,736, for example, by stripping the cladding 22 and jacket 24 from the end of the fiber to expose a predetermined length of fiber core 22, and by further stripping the jacket from the cladding 22, as by approximately the same predetermined amount. Preferably, the tip 30 of the fiber core is cut and polished flat so that the cut and polished face is normal to the longitudinal axis of the fiber. The fiber tip may be placed in contact with protective window 62 or spaced slightly therefrom as shown in the figure. The fiber may be supported in bore 44 of inner member 42 with the jacket contacting the surface of the bore. It is desirable that member 42 not contact the fiber core 20 in order to avoid leakage of the laser beam being transmitted through the fiber into the member.

As the laser beam exits from the bottom 30 of the optical fiber, it diverges as shown by the dotted lines 32 in FIG. 1 and is projected onto the surface of workpiece 50 through opening 58 in the bushing. The optical energy impinging upon the surface of the workpiece may cause melting of the workpiece and the formation of a molten weld pool 80, as shown. The degree of heating of the workpiece is a function of the power density of the optical energy applied to the workpiece, and this may be controlled in a number of different ways. Among other things, the power density is a function of the laser power and of the spot size of the laser beam projected onto the workpiece. Since the laser beam emitted from the optical fiber diverges, the power density therefore varies with distance of the optical fiber top from the workpiece. Thus, one way to control power density is to vary the location of the top 30 of the optical fiber relative to the end 48 of the tool housing, and the tool 18 may be constructed to enable adjustment of the fiber location in the bore. While physically positioning the tip of the fiber relative to the workpiece permits control of power density, this is not a convenient way of controlling power density. It is desirable to maintain a reasonable working distance between the workpiece and the bottom of the optical fiber, and it is also desirable to keep this distance small in order to maximize the power density on the surface of the workpiece while providing a convenient way of precisely controlling the power density.

Commonly assigned U.S. application Ser. No. 136,071, filed Dec. 21, 1987 discloses a non-contacting lensless output coupler for a fiber optic laser materials processing apparatus. This application teaches that the diverging portion of a laser beam from the output end of an optical fiber is characterized by an exit cone angle which is approximately equal to the entrance cone angle of the laser beam injected into the input end of the optical fiber. Since the power density is a function of the projected beam spot size, which in turn is a function of the divergence or exit cone angle of the laser beam, power density may be controlled by controlling the entrance cone angle of the laser beam injected into the optical fiber by coupler 16, as well as by controlling the power in the laser beam injected into the optical fiber. In addition, the bottom 30 of the optical fiber core may be shaped, if desired, to provide a convex lens effect for focusing of the laser beam emitted from the fiber. A lens system could also be incorporated into the tool 18 for focusing the laser beam emitted from the fiber, but this would complicate the structure.

In operation, tool 18 is employed for engaging one of the workpieces being joined, in the manner shown in FIG. 1, and for applying the desired pressure for joining. For spot welding two workpieces, it is necessary to provide sufficient compressive pressure between the two workpieces to reduce the thermal resistance at their contact surfaces. The tool also directs the laser beam to a desired location on the workpiece and permits precise control of the locations where the workpieces are joined. The tool is somewhat analogous to a resistance heated electrode, but avoids the disadvantages of such electrodes in heating surrounding components. While applying pressure with the tool, laser 12 may then be pulsed to inject energy via coupler 16 into the optical fiber. The laser beam is transmitted through the optical fiber to its output end. The diverging beam from the tip of the output fiber is projected onto the workpiece through opening 58 in the bushing.

Purging gas from source 72 flows through passages 70 and through the chamber in the bushing above opening 58. Preferably, the gas flow is at a relatively high velocity to assist in cooling the tool (heating may occur from workpiece contact) and in affording protection to the optical components by removing vaporized products produced during the joining process which would otherwise be deposited onto the protective window 62 and attenuate the laser energy. The gas flow is also beneficial in depressing the plume and affording good coupling efficiency.

The energy applied to the workpiece may be controlled in the manner previously described by controlling the power injected into the optical fiber, including the laser pulse rate. Between pulses, the infrared radiation emitted from the surface of the workpiece may be sensed to determine its temperature. This facilitates control of the amount of power applied to the workpiece and, accordingly, the degree of melting or heating of the workpiece. The infrared radiation may be sensed in different ways. For example, the radiation may be sensed from the underside of workpiece 52 (in FIG. 1) by a sensor such as infrared detector or camera (not illustrated). Also, tool 18 may be provided with a second optical fiber which views the projected beam spot within opening 58 on the surface of the workpiece and transmits the infrared energy to a remote sensor.

As will be appreciated from the foregoing, tool 18 serves as a holder for the output end of the optical fiber which enables the laser beam to be directed rather precisely to a desired location on a workpiece, and serves as a tool for applying mechanical pressure to workpieces to be joined simultaneously with the application of laser energy. Accordingly, it functions somewhat like a conventional spot welding electrode. As will further be appreciated, tool 18 may be used for joining workpieces in an automated system, in a robotic welder or the like, as well as a hand-held tool. Since the tool does not require focusing optics at the output end of the optical fiber, the tool housing may be very slender to facilitate access to parts located at a confined space. As compared to conventional resistance-type spot welding devices, the invention enables sufficient interface loads to be applied to a workpiece surface to effect joining while affording minimum wear to the tool as compared to conventional spot welding electrodes.

While a preferred embodiment of the invention has been shown and described, it will be appreciated by those skilled in the art that changes may be made in this embodiment without departing from the principles and spirit of the invention, the scope of which is defined in the appended claims.

What is claimed is:

1. Laser joining apparatus for spot welding, brazing or soldering comprising an optical fiber for transmitting a laser beam; means for injecting the laser beam into an input end of the optical fiber for transmission therethrough; an elongated housing having means for engaging and exerting pressure on a workpiece, the engaging means having an opening therein; and means within the housing for supporting an output end of the optical fiber with respect to the opening, the optical fiber being positioned such that a diverging portion of the laser beam emitted from the optical fiber is projected directly from the output end of the optical fiber through the opening onto the workpiece.

2. The apparatus of claim 1, wherein the engaging means comprises a flat end of the housing disposed substantially normal to a longitudinal axis of the housing, and a bushing disposed within the flat end for engagement with the workpiece, said opening being formed in the bushing.

3. The apparatus of claim 2 further comprising a window disposed between the end of the optical fiber and the bushing, the window and the opening in the bushing defining therebetween a chamber adjacent to a surface of the workpiece.

4. The apparatus of claim 3 further comprising means for passing a gas through said chamber.

5. The apparatus of claim 4, wherein said bushing has a slotted portion which contacts the window, and wherein said gas passing means comprises passages formed within the housing so as to communicate with the chamber via the slotted portion of the bushing.

6. The apparatus of claim 5, wherein said passages comprise a plurality of arc-shaped longitudinally extending passages formed between an inner surface of the housing and said member which supports the optical fiber, and a source of inert gas connected to at least one of said passages.

7. The apparatus of claim 6, wherein the supporting means comprises an elongated support member having a longitudinal bore and being disposed within the housing such that the bore is coaxial with the longitudinal axis of the housing, and wherein the output end of the optical fiber is received and supported in the bore.

8. The apparatus of claim 7, wherein the window is supported by the slotted portion of the bushing within a cutout in the optical fiber support member adjacent to the output end of the optical fiber.

9. The apparatus of claim 7, wherein the optical fiber has a core which is covered by a cladding and an outer jacket about the cladding, and wherein a first portion at the output end of the optical fiber is stripped to expose the core and a second portion adjacent to the first portion is stripped to expose the cladding.

10. The apparatus of claim 9, wherein the fiber core has a tip from which the laser beam is emitted, and the bottom is polished flat and disposed adjacent to the window.

11. The apparatus of claim 1, wherein the injecting means comprises means for controlling the power density of the laser beam emitted from the output end of the optical fiber.

12. Laser joining apparatus comprising an optical fiber having an input end and an output end for transmitting a laser beam therethrough; a tool disposed at the output end of the optical fiber, the tool including an elongated housing having a flat end for engaging and for applying pressure to a first workpiece in contact with a second workpiece, the flat end having an opening therein; and means for supporting the optical fiber within the housing with the output end of the fiber positioned adjacent to the opening and a predetermined distance from the first workpiece so that a diverging portion of the laser beam emitted from the output end of the optical fiber directly projects a beam spot through the opening onto the workpiece.

13. The apparatus of claim 12, wherein the housing has a chamber therein communicating with the opening and disposed between the opening and the output end of the optical fiber, and wherein means is included for passing a gas through the chamber.

14. The apparatus of claim 12, wherein the chamber is formed in an annular bushing disposed in the flat end of the housing, the bushing having a slotted portion which communicates with gas passages formed within the housing.

15. The apparatus of claim 14, wherein the slotted portion of the bushing supports a protective window adjacent to the end of the optical fiber between said end and the chamber.

16. The apparatus of claim 15, wherein the optical fiber supporting means comprises an elongated support member having a longitudinal bore disposed within the housing such that the bore is coaxial with a longitudinal axis of the housing, the passages being formed between an inner surface of the housing and an outer surface of the support member, and wherein said window is supported on the slotted portion of the bushing with a cutout formed in the support member.

17. The apparatus of claim 16, wherein the support member and window are formed of material selected from the group consisting of quartz and plastic.

18. The apparatus of claim 13, wherein the gas passing means comprise means for providing a flow of gas through the chamber with a sufficient velocity to remove vaporization products.

19. The apparatus of claim 13, wherein said gas comprises an inert gas.

20. Pulsed laser processing apparatus comprising an optical fiber for transmitting a laser beam; means for injecting the laser beam into an input end of the optical fiber for transmission therethrough; an elongated housing having means for engaging and exerting pressure on a workpiece, the engaging means having an opening therein; means within the housing for supporting an output end of the optical fiber with respect to the opening, the output end being positioned such that a diverging portion of the laser beam emitted from the optical fiber is directly projected through the opening onto the workpiece for heating the workpiece to the processing temperature; and means for infrared sensing the magnitude of the temperature at the workpiece by synchronization of laser pulsing and infrared sensing.

* * * * *